US006985738B1

(12) United States Patent
Ekstam et al.

(10) Patent No.: US 6,985,738 B1
(45) Date of Patent: Jan. 10, 2006

(54) AUTOMATIC IMPLEMENTATION OF CHANNEL PLAN CHANGE IN CELLULAR NETWORK

(75) Inventors: Hanna Maria Ekstam, Linköping (SE); Simon Henrik Mattias Eneland, Mjölby (SE); Gunilla Larsson, Lier (NO); Eva Madsen, Vreta Kloster (SE); Håkan Lars Palm, Lund (SE); Johan Schultz, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 647 days.

(21) Appl. No.: 10/019,692

(22) PCT Filed: Jul. 4, 2000

(86) PCT No.: PCT/SE00/01419

§ 371 (c)(1),
(2), (4) Date: Apr. 2, 2002

(87) PCT Pub. No.: WO01/03458

PCT Pub. Date: Jan. 11, 2001

(30) Foreign Application Priority Data

Jul. 6, 1999 (SE) .......................................... 9902606

(51) Int. Cl.
*H04Q 7/20* (2006.01)

(52) U.S. Cl. ..................... 455/452.1; 455/447; 455/450

(58) Field of Classification Search ............. 455/452.1, 455/451, 450, 452.2, 447, 446, 509, 510, 455/513, 422.1, 464, 62, 63.3, 63.1; 370/329
See application file for complete search history.

(56) References Cited

U.S. PATENT DOCUMENTS

| | | | | |
|---|---|---|---|---|
| 5,513,379 A | | 4/1996 | Benveniste et al. | 455/451 |
| 5,603,085 A | | 2/1997 | Shedlo | 455/450 |
| 5,974,324 A | * | 10/1999 | Henson | 455/447 |
| 6,052,593 A | * | 4/2000 | Guimont et al. | 455/446 |

FOREIGN PATENT DOCUMENTS

| | | |
|---|---|---|
| WO | 98/35519 A2 | 8/1998 |
| WO | 98/51101 A2 | 11/1998 |
| WO | 98/53632 A2 | 11/1998 |

* cited by examiner

*Primary Examiner*—Lester G. Kincaid
*Assistant Examiner*—Eliseo Ramos-Feliciano
(74) *Attorney, Agent, or Firm*—Nixon & Vanderhye, P.C.

(57) ABSTRACT

The invention concerns methods for automatically implementing channel changes from a current plan to a new predetermined plan in a cellular network comprising a plurality of cells, each cell corresponding to at least one equipment, to which a channel may be allocated for communicating signals to and from mobile end stations in the cell. The methods involve that the sequence for how the equipment should be changed is determined by an order number, relating to cell location, equipment number, present channel number or new channel number. The invention leads to an efficient implementation of given channel changes causing a minimum of disturbances.

16 Claims, 13 Drawing Sheets current cell plan new cell plan

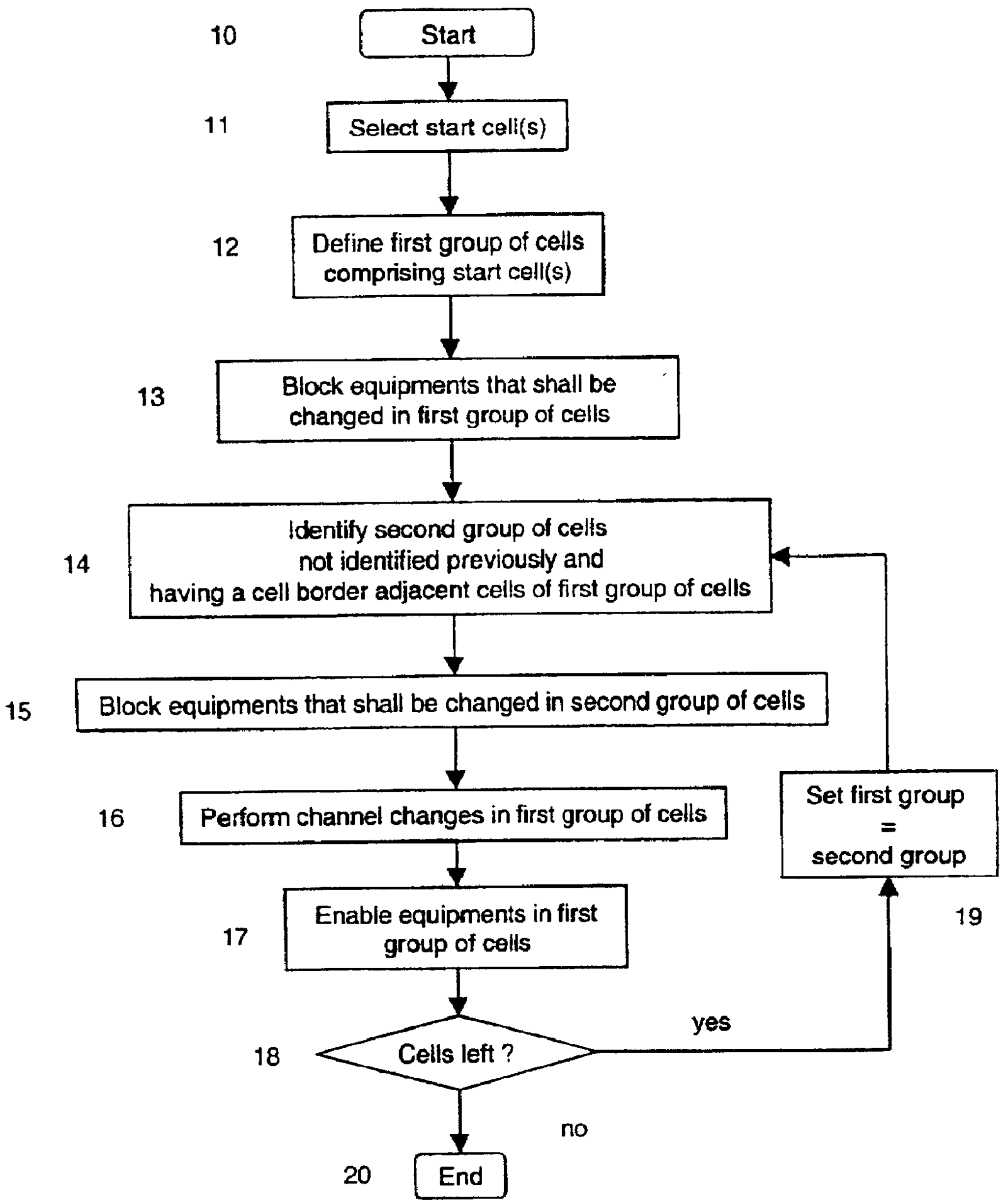
Fig. 1 - Routine #1

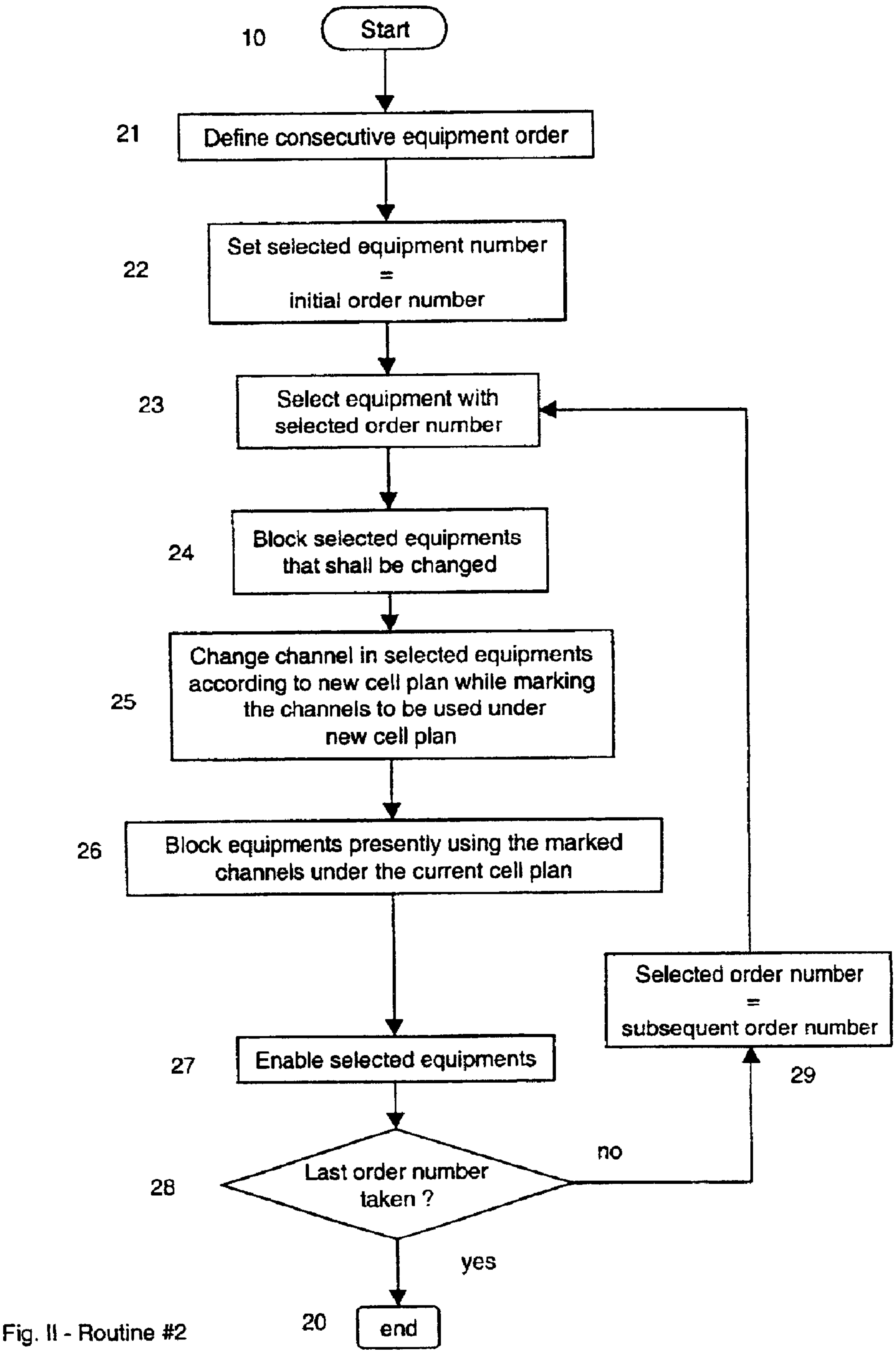
Fig. II - Routine #2

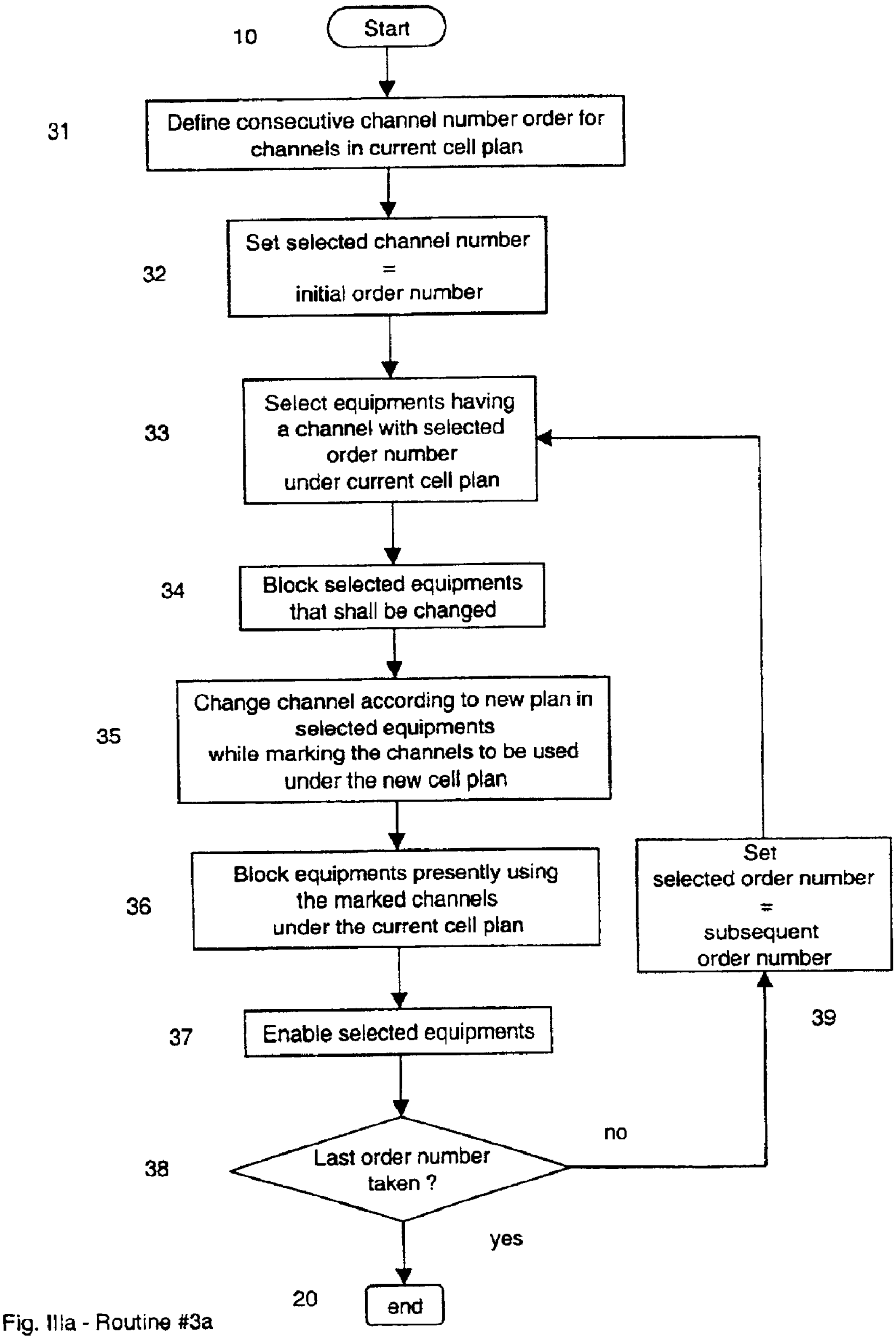
Fig. IIIa - Routine #3a

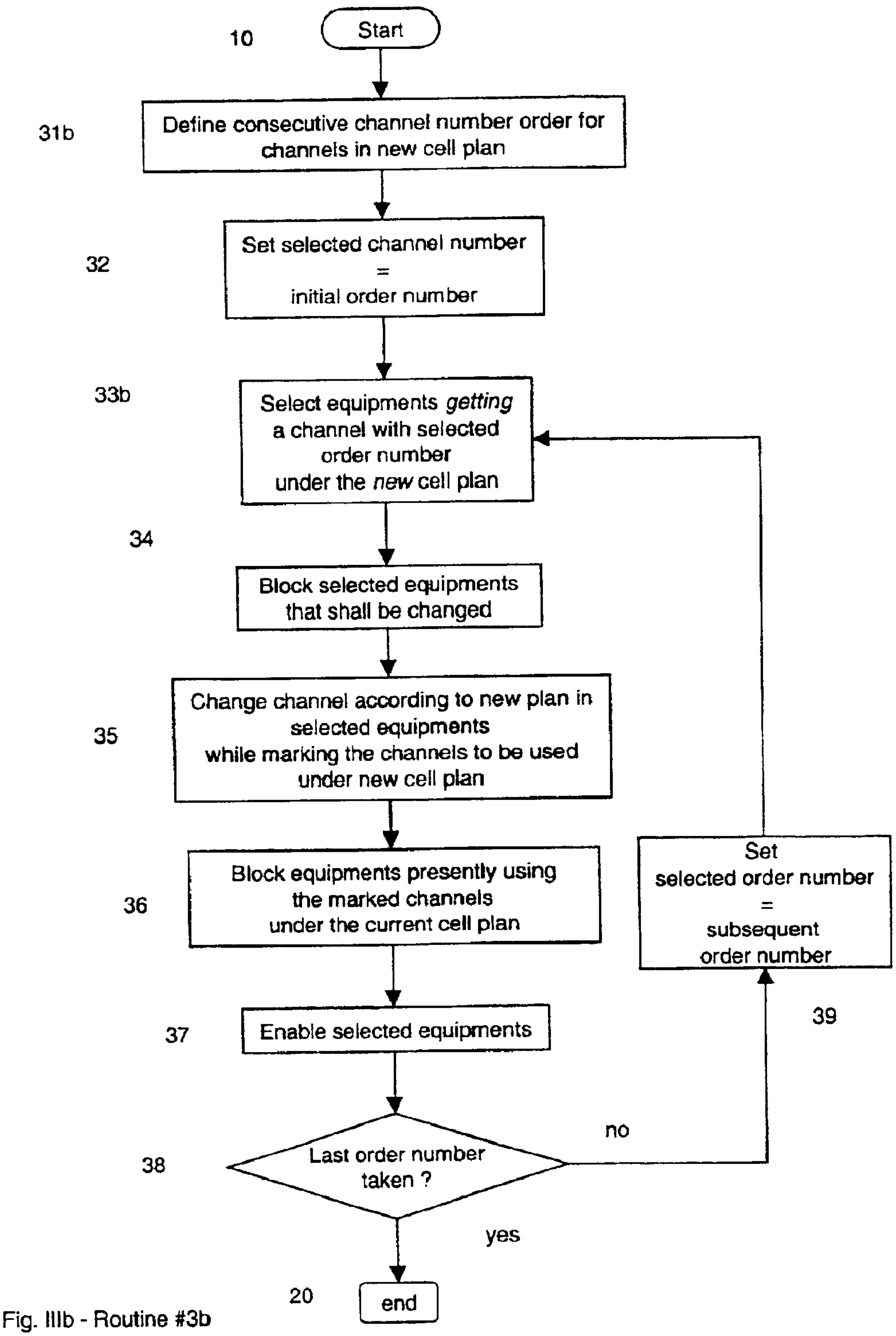
Fig. IIIb - Routine #3b

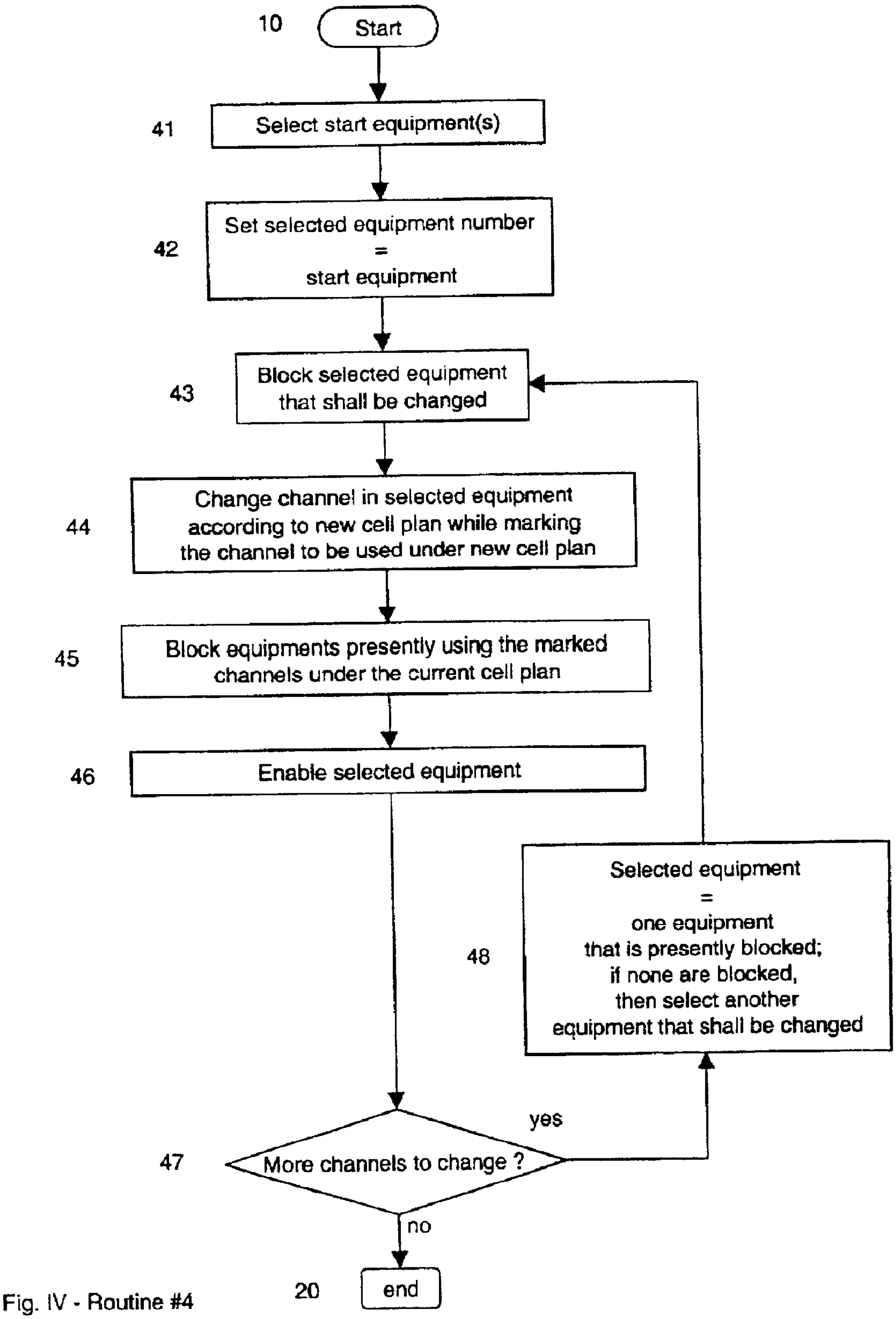
Fig. IV - Routine #4

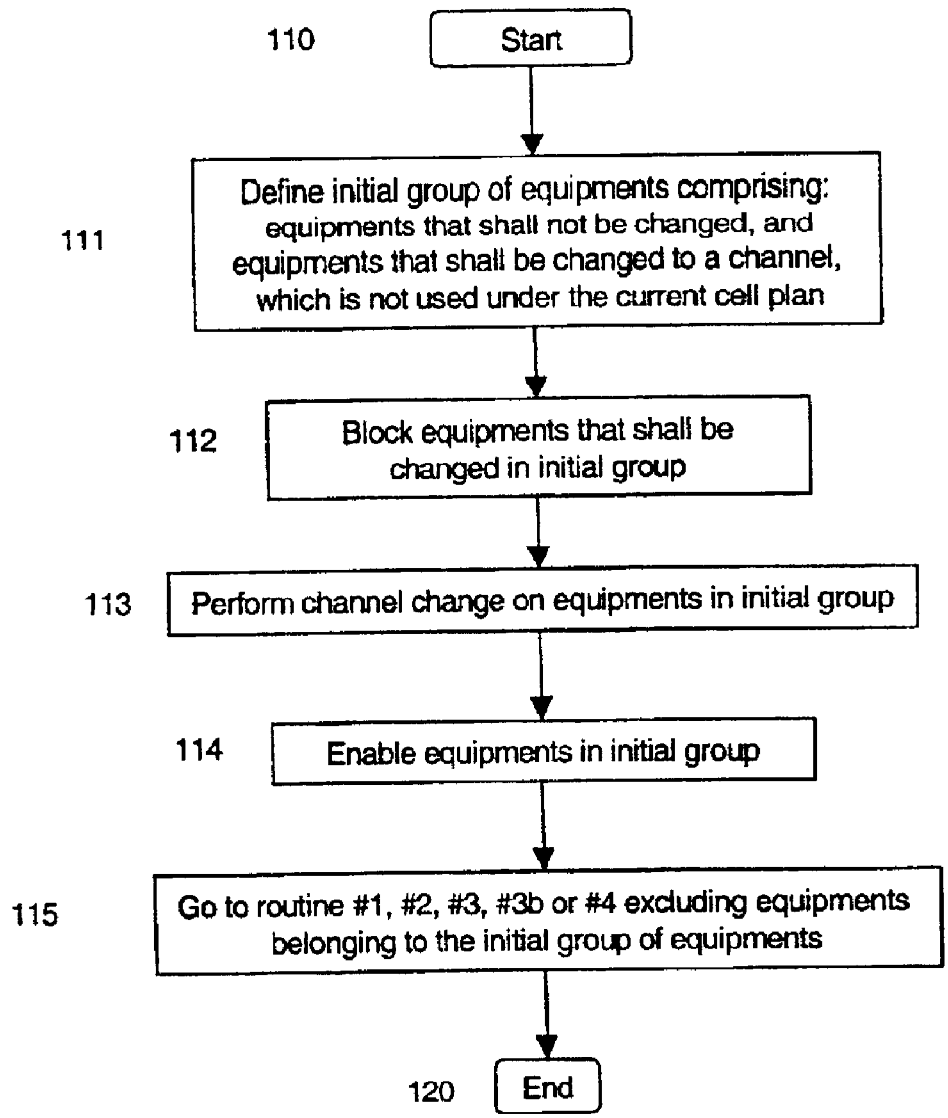
Fig. V - Routine #0

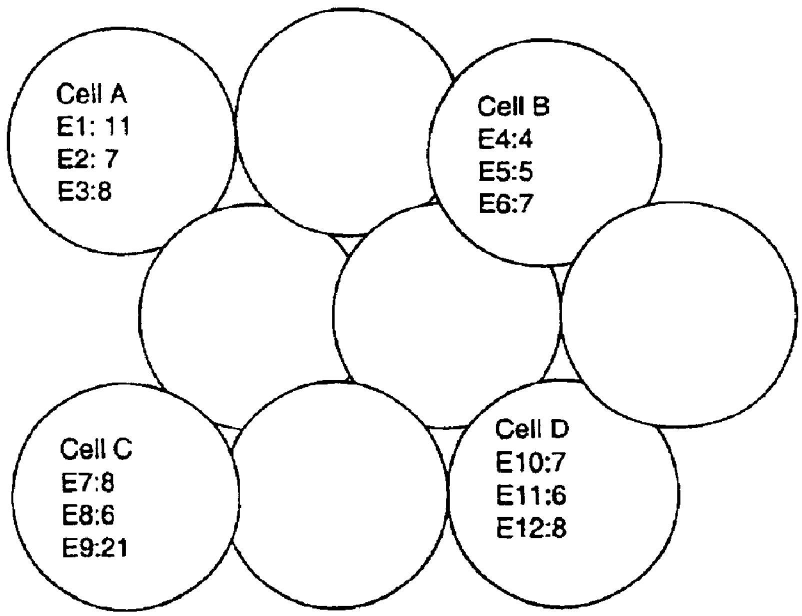
Fig. 2a - current cell plan
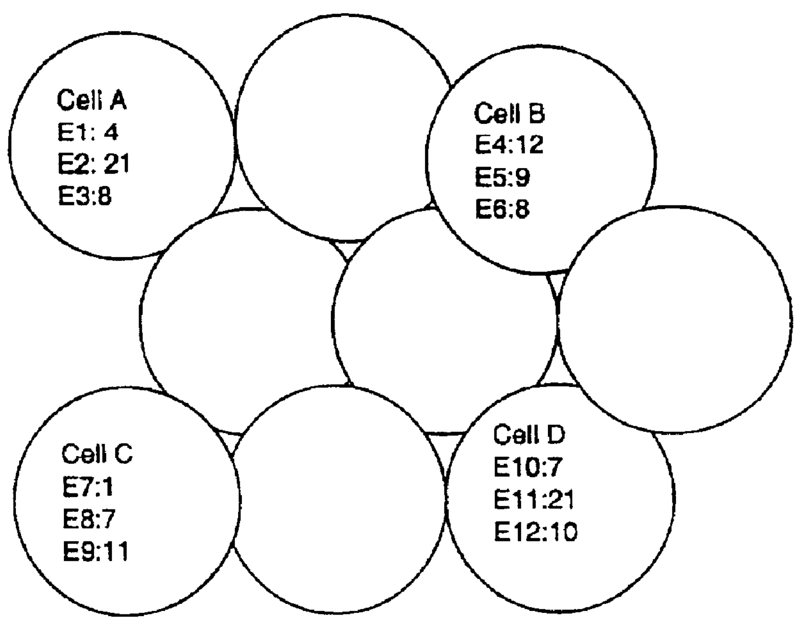
Fig. 2b - new cell plan

| | Cell | Cell A | | | Cell B | | | Cell C | | | Cell D | | | |
|---|---|---|---|---|---|---|---|---|---|---|---|---|---|---|
| → | equip | 1 | 2 | 3 | 4 | 5 | 6 | 7 | 8 | 9 | 10 | 11 | 12 | |
| | Change | 11 to 4 | 7 to 21 | 8 | 4 to 12 | 5 to 9 | 7 to 8 | 8 to 1 | 6 to 7 | 21 to 11 | 7 | 6 to 21 | 8 to 10 | No of blc |
| Inc | Order | | | | | | | | | | | | | |
| 1 | | | | | | | | | | | | | | |
| 2 | 1 | blc | | | blc | | | | | | | | | 2 |
| 3 | 1 | 4 | | | - | | | | | | | | | 1 |
| 4 | 2 | | blc | | - | | | | | blc | | | | 3 |
| 5 | 2 | | 21 | | - | | | | | - | | | | 2 |
| 6 | 3 | | | | - | | | blc | | - | | | blc | 4 |
| 7 | 3 | | | | - | | | - | | - | | | - | 4 |
| 8 | 4 | | | | blc | | | - | | - | | | - | 4 |
| 9 | 4 | | | | 12 | | | - | | - | | | - | 3 |
| 10 | 5 | | | | | blc | | - | | - | | | - | 4 |
| 11 | 5 | | | | | 9 | | - | | - | | | - | 3 |
| 12 | 6 | | | | | | blc | - | | - | | | blc | 4 |
| 13 | 6 | | | | | | 8 | - | | - | | | - | 3 |
| 14 | 7 | | | | | | | blc | | - | | | - | 3 |
| 15 | 7 | | | | | | | 1 | | - | | | - | 2 |
| 16 | 8 | | | | | | | | blc | - | | | - | 3 |
| 17 | 8 | | | | | | | | 7 | - | | | - | 2 |
| 18 | 9 | | | | | | | | | blc | | | - | 2 |
| 19 | 9 | | | | | | | | | 11 | | | - | 1 |
| 20 | 10 | | | | | | | | | | | | - | 0 |
| 21 | 10 | | | | | | | | | | | | - | 1 |
| 22 | 11 | | | | | | | | | | | blc | - | 2 |
| 23 | 11 | | | | | | | | | | | 21 | - | 1 |
| 24 | 12 | | | | | | | | | | | | blc | 1 |
| 25 | 12 | | | | | | | | | | | | 10 | 0 |
| | End | | | | | | | | | | | | | 55 |

Fig. 3 - Routine #2

| | Cell | Cell A | | | Cell B | | | Cell C | | | Cell D | | | |
|---|---|---|---|---|---|---|---|---|---|---|---|---|---|---|
| | equip | 1 | 2 | 3 | 4 | 5 | 6 | 7 | 8 | 9 | 10 | 11 | 12 | |
| → | Change | 11 to 4 | 7 to 21 | 8 | 4 to 12 | 5 to 9 | 7 to 8 | 8 to 1 | 6 to 7 | 21 to 11 | 7 | 6 to 21 | 8 to 10 | No of blc |
| inc | Order | | | | | | | | | | | | | 0 |
| 1 | - | | | | | | | | | | | | | 0 |
| 2 | 4 | | | | blc | | | | | | | | | 1 |
| 3 | 4 | | | | 12 | | | | | | | | | 0 |
| 4 | 5 | | | | | blc | | | | | | | | 1 |
| 5 | 5 | | | | | 9 | | | | | | | | 0 |
| 6 | 6 | | blc | | | | blc | | blc | blc | | blc | | 5 |
| 7 | 6 | | - | | | | - | | 7 | - | | 21 | | 3 |
| 8 | 7 | | blc | | | | blc | blc | | - | | | blc | 5 |
| 9 | 7 | | 21 | | | | 8 | - | | - | | | - | 3 |
| 10 | 8 | | | | | | | blc | | - | | | blc | 3 |
| 11 | 8 | | | | | | | 1 | | - | | | 10 | 1 |
| 12 | 11 | blc | | | | | | | | - | | | | 2 |
| 13 | 11 | 4 | | | | | | | | - | | | | 1 |
| 14 | 21 | | | | | | | | | blc | | | | 1 |
| 15 | 21 | | | | | | | | | 11 | | | | 0 |
| nd | | | | | | | | | | | | | | 26 |

Fig. 4 - routine #3a

| | Cell | Cell A | | | Cell B | | | Cell C | | | Cell D | | | |
|---|---|---|---|---|---|---|---|---|---|---|---|---|---|---|
| | equip | 1 | 2 | 3 | 4 | 5 | 6 | 7 | 8 | 9 | 10 | 11 | 12 | |
| → | Ch an ge | 11 to 4 | 7 to 21 | 8 | 4 to 12 | 5 to 9 | 7 to 8 | 8 to 1 | 6 to 7 | 21 to 11 | 7 | 6 to 21 | 8 to 10 | No of blc |
| Inc | Ord er | | | | | | | | | | | | | 0 |
| 1 | | | | | | | | | | | | | | 0 |
| 2 | 1 | | | | | | | blc | | | | | | 1 |
| 3 | 1 | | | | | | | 1 | | | | | | 0 |
| 4 | 4 | blc | | | blc | | | | | | | | | 2 |
| 5 | 4 | 4 | | | - | | | | | | | | | 1 |
| 6 | 7 | | blc | | - | | blc | | blc | | | | | 4 |
| 7 | 7 | | - | | - | | - | | 7 | | | | | 3 |
| 8 | 8 | | - | | - | | blc | | | | | | blc | 4 |
| 9 | 8 | | - | | - | | 8 | | | | | | - | 3 |
| 10 | 9 | | - | | - | blc | | | | | | | - | 3 |
| 11 | 9 | | - | | - | 9 | | | | | | | - | 3 |
| 12 | 10 | | - | | - | | | | | | | | blc | 3 |
| 13 | 10 | | - | | - | | | | | | | | 10 | 2 |
| 14 | 11 | | - | | - | | | | | blc | | | | 2 |
| 15 | 11 | | - | | - | | | | | 11 | | | | 2 |
| 16 | 12 | | - | | blc | | | | | | | | | 2 |
| 17 | 12 | | - | | 12 | | | | | | | | | 1 |
| 18 | 21 | | blc | | | | | | | | | blc | | 2 |
| 19 | 21 | | 21 | | | | | | | | | 21 | | 0 |
| nd | | | | | | | | | | | | | | 38 |

Fig. 5 - Routine #3b

| | Cell | Cell A | | | Cell B | | | Cell C | | | Cell D | | | |
|---|---|---|---|---|---|---|---|---|---|---|---|---|---|---|
| | equip | 1 | 2 | 3 | 4 | 5 | 6 | 7 | 8 | 9 | 10 | 11 | 12 | |
| | Change | 11 to 4 | 7 to 21 | 8 | 4 to 12 | 5 to 9 | 7 to 8 | 8 to 1 | 6 to 7 | 21 to 11 | 7 | 6 to 21 | 8 to 10 | No of blc |
| Inc | Order | | | | | | | | | | | | | |
| 1 | 8 | | blc | | | | blc | | blc | | | | | 3 |
| 2 | 8 | | - | | | | - | | 7 | | | | | 2 |
| 3 | 2 | | blc | | | | - | | | blc | | | | 3 |
| 4 | 2 | | 21 | | | | - | | | - | | | | 2 |
| 5 | 6 | | | | | | blc | blc | | - | | | blc | 4 |
| 6 | 6 | | | | | | 8 | - | | - | | | - | 3 |
| 7 | 9 | blc | | | | | | - | | - | | | - | 4 |
| 8 | 9 | - | | | | | | - | | 11 | | | - | 3 |
| 9 | 7 | - | | | | | | blc | | | | | - | 3 |
| 10 | 7 | - | | | | | | 1 | | | | | - | 2 |
| 11 | 12 | - | | | | | | | | | | | blc | 2 |
| 12 | 12 | - | | | | | | | | | | | 10 | 1 |
| 13 | 1 | blc | | | blc | | | | | | | | | 2 |
| 14 | 1 | 4 | | | - | | | | | | | | | 1 |
| 15 | 4 | | | | - | | | | | | | | | 1 |
| 16 | 4 | | | | 12 | | | | | | | | | 0 |
| 17 | 5 | | | | | blc | | | | | | | | 1 |
| 18 | 5 | | | | | 9 | | | | | | | | 0 |
| 19 | 11 | | | | | | | | | | | blc | | 1 |
| 20 | 11 | | | | | | | | | | | 21 | | 0 |
| End | | | | | | | | | | | | | | 38 |

Fig. 6 - Routine #4

| | Cell | Cell A | | | Cell B | | | Cell C | | | Cell D | | | |
|---|---|---|---|---|---|---|---|---|---|---|---|---|---|---|
| | equip | 1 | 2 | 3 | 4 | 5 | 6 | 7 | 8 | 9 | 10 | 11 | 12 | |
| | Change | 11 to 4 | 7 to 21 | 8 | 4 to 12 | 5 to 9 | 7 to 8 | 8 to 1 | 6 to 7 | 21 to 11 | 7 | 6 to 21 | 8 to 10 | No of blc |
| Inc | Order | | | | | | | | | | | | | |
| 1 | | | | | blc | blc | | blc | | | | | blc | 4 |
| 2 | 1 | | | | 12 | 9 | | 1 | | | | | 10 | |

Fig. 7 - Routine #0

| | Cell | Cell A | | | Cell B | | | Cell C | | | Cell D | | | |
|---|---|---|---|---|---|---|---|---|---|---|---|---|---|---|
| → | equip | 1 | 2 | | | | 6 | | 8 | 9 | | 11 | | |
| | Change | 11 to 4 | 7 to 21 | | | | 7 to 8 | | 6 to 7 | 21 to 11 | | 6 to 21 | | No of blc |
| Inc | Order | | | | | | | | | | | | | |
| 1 | | | | | | | | | | | | | | |
| 2 | 1 | blc | | | | | | | | | | | | 1 |
| 3 | 1 | 4 | | | | | | | | | | | | 0 |
| 4 | 2 | | blc | | | | | | | blc | | | | 2 |
| 5 | 2 | | 21 | | | | | | | - | | | | 1 |
| 6 | 6 | | | | | | blc | | | - | | | | 2 |
| 7 | 6 | | | | | | 8 | | | - | | | | 1 |
| 8 | 8 | | | | | | | | blc | - | | | | 2 |
| 9 | 8 | | | | | | | | 7 | - | | | | 1 |
| 10 | 9 | | | | | | | | | blc | | | | 1 |
| 11 | 9 | | | | | | | | | 11 | | | | 0 |
| 12 | 11 | | | | | | | | | | | blc | | 1 |
| 13 | 11 | | | | | | | | | | | 21 | | |

Fig. 8 - Routine #0 + #2

AUTOMATIC IMPLEMENTATION OF CHANNEL PLAN CHANGE IN CELLULAR NETWORK

This application is the US national phase of international application PCT/SE00/01419 filed Jul. 4, 2000 which designated the U.S. and claims benefit of SE9902606–4, filed Jul. 6, 1999, the entire contents of which is hereby incorporated by reference.

FIELD OF THE INVENTION

The present invention relates to methods for automatically carrying out predetermined channel plan changes in a cellular network.

BACKGROUND OF THE INVENTION

A common type of conventional mobile wireless communication system comprises a plurality of radio base stations, which are distributed over a certain geographical area. Communication with mobile end stations is transmitted through a local base station and on to a central network, which may be coupled to the public switched telephone network.

In such systems, a cell can be defined as the local geographical area, in which communication between a mobile end station and the base station in question can be carried out while meeting a set of predefined parameters. Such parameters could correspond to comparative measured signal strength values for signals transmitted between a mobile end station and a given base station and neighbouring base stations, respectively. The parameters may also relate to error rates. When so-called handover criteria are met, the mobile end station in question is handed over to a neighbouring base station.

Each base station is allocated a certain group of frequencies or communication channels, which are different from neighbouring cells. In this manner, it is accomplished that communication in a given cell is not disturbed by communication taking place in adjacent cells.

Many cellular systems have an inherent ability to direct traffic to more base stations for a given locality. This feature can be used to allocate the mobile end station in question to the base station which presently has free capacity or—in case of a base station failure—to direct a given mobile to a properly operating neighbouring base station. This redundancy enhances of course the reliability of the system.

However, radio spectrum is a sparse commodity and only a limited number of radio channels would normally be available to a given network provider. In order to utilise the allocated radio spectrum efficiently; frequencies or channels are typically re-used in a plurality of cells, which are situated at a certain minimum distance from one another.

Examples of such cell patterns wherein frequency re-use is implemented are for instance shown in prior art document WO98/35519.

For this type of cellular network, a certain frequency allocation plan for distributing allowed frequencies to the various cells are implemented at the planning stage of the network. Such frequency allocation plans are initially based on models, which may not correspond very well to reality. Therefore, they have to be revised once the network is put into operation. Several modifications to the frequency plan are typically necessary. The frequency plan may also be modified in order to take account of network expansion or changes in the physical conditions.

Many solutions exist for calculating appropriate cell plans. For instance prior art document EP-A-0 847 213 discloses a routine for assigning carrier frequencies to base stations in a non-interfering manner.

Methods for revising an existing cell plan are also known. Prior art document U.S. Pat. No. 5,603,085 discloses such a method.

The implementation of a new cell plan in a network is typically handled by the network operator by programming various operations in the network management system controlling the base stations in the network. During the implementation, the operations in question partly block large proportions of the network and the traffic related thereto. This leads to comparatively long outage times, decreased quality of service and lost revenues.

SUMMARY OF THE INVENTION

One object of the invention is to decrease the time it takes to put a new predetermined cell plan into operation, thereby decreasing the adverse effects mentioned above.

According to a first aspect of the invention, this object has been achieved by the subject matter defined in claim 1.

The above object has furthermore been achieved in alternative ways as defined by claims 2–8, respectively.

BRIEF DESCRIPTION OF THE FIGURES

FIG. I discloses a first embodiment of a routine for carrying out a cell plan change according to the invention, FIG. II discloses a second embodiment of a routine according to the invention, FIG. IIIa discloses a third embodiment of a routine according to the invention, FIG. IIIb discloses a third alternative embodiment of a routine according to the invention, FIG. IV discloses a fourth embodiment of the invention, FIG. V discloses a complementing embodiment an initial routine according to the invention, FIG. 1*a* discloses a first stage in the cell plan change according to the first embodiment, FIG. 1*b* discloses a second stage in the cell plan change according to the first embodiment, FIG. 2*a* relates to an excerpt from an exemplary current cell plan, FIG. 2*b* relates to an excerpt from an exemplary new cell plan, FIG. 3 is a scheme based on the cell plan change shown in FIGS. 2*a* and 2*b* using the second embodiment of the routine according to the invention showing the cell plan change being performed over time, FIG. 4 is a scheme based on the cell plan change shown in FIGS. 2*a* and 2*b* using the third embodiment of the routine according to the invention showing the cell plan change being performed over time, FIG. 5 is a scheme based on the cell plan change shown in FIGS. 2*a* and 2*b* using the third alternative embodiment of the routine according to the invention showing the cell plan change being performed over time, FIG. 6 is a scheme based on the cell plan change shown in FIGS. 2*a* and 2*b* using the fourth embodiment of the routine according to the invention showing the cell plan change being performed over time, and FIGS. 7 and 8 are schemes based on the cell plan change shown in FIGS. 2*a* and 2*b* using the complementing embodiment and subsequently the second embodiment of the invention showing the cell plan change being performed over time.

DETAILED DESCRIPTION OF THE INVENTION WITH REGARD TO THE DRAWINGS AND TABLES

Figure 1A:
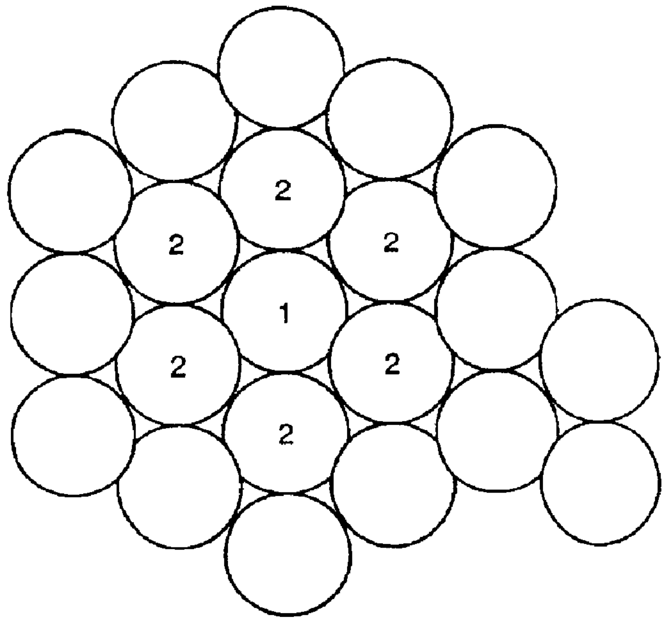

The present invention is applicable to a cellular network having a structure similar to WO98/35519 described above. However, in contrast to WO98/35519, where predetermined bundles of channels are asserted to respective cells and are re-allocated between these, the present invention also refers to a situation where only some of the channels in a respective cell may be changed.

According to the present invention, the cellular network is primarily defined by means of a plurality of equipments being distributed over a given area. The individual equipments are adapted to convey signals between mobile end stations in an area, i.e. cell, related to emission and reception conditions existing for the equipment and the handover criteria between cells. One or more equipments may form a cell. More neighbouring equipments using the same channel and sending the same information may form a "large" cell.

In the present context, changing cell plan means that channels are changed on the respective equipments.

In the following, the term channel should be understood broadly as communication channel. The notion channel could refer to an individual channel or a group of channels. The notion term channel may for instance relate to frequencies, but could also relate to time slots in multiplexed systems. The notion co-channel refers to the same channel or group of channels being implemented on more equipments in different cells or equipments.

In the following, it should be understood that each equipment might be allocated a new channel. For undertaking such a change from a current cell plan to a new plan, the following steps will have to be carried out in each individual equipment.

First, the equipment is blocked or blocked from communicating on the current channel, i.e. the equipment is switched off. Then the channel change is effectuated on the equipment and subsequently the equipment is enabled, that is the equipment is turned on again and communication is now ready to take place on the channel switched to.

The main object of the present invention is to facilitate a quick and disturbance free implementation of the cell change.

Two extreme strategies can be envisaged.

On one hand, it is clear that a channel change on all equipments simultaneously would have adverse effects on the network traffic, because the ability to choose alternative communication channels in the network—which is an inherent feature of most cellular networks—will not be utilised. Moreover, the network management system would normally not be able to carry out such a vast task momentarily, because of limitations in processing power.

On the other hand, it is also clear that a cell change strategy wherein every single equipment is changed one at a time would result in adjacent cells are being allocated the same channels, which would disturb one another.

For this reason, it will be necessary to block not only the given equipment under change, but potentially also other equipment that could or would disturb the given equipment under change.

Therefore according to the invention, the following steps are carried out:

determining a sequence order for how the equipment or channels should be changed, the sequence possibly being random, carrying out a subroutine in which
- selecting individual equipment or equipments according to the sequence order or according to those equipments which are presently blocked,
- blocking the selected equipment, while blocking other equipment which could or would disturb the selected equipment, while effectuating the change of communication channels on the selected equipment,
- enabling the selected equipment,
- selecting a new equipment and repeating the above subroutine until all equipments which should change channel have been changed.

These steps shall be further explained as set out by the routines #1, #2, #3*a,* #3*b,* #4 and #0 below.

First Preferred Embodiment

Routine #1

Figure 1B:
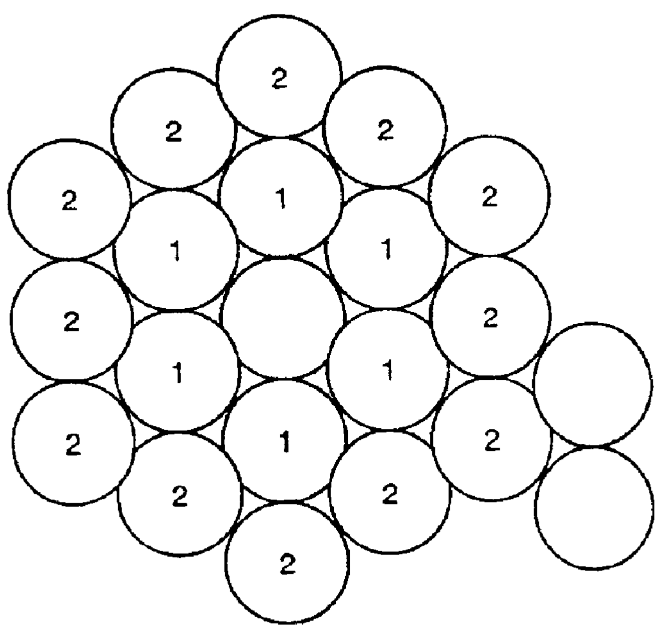

FIGS. 1*a* and 1*b* relate to two stages in the implementation of a cell plan change using the first routine. These stages shall now be explained with reference to the flow diagram for the first routine shown in FIG. 1. It should be understood that each cell in FIGS. 1*a* and 1*b* might comprise a number of equipments each being adapted for being allocated a channel.

FIG. 1*a* shows a start cell being selected according to step 11. In the present case, this start cell corresponds to the first group of cells denoted by order number "1" and defined in accordance with step 12.

In step 13, all equipments in the above first group are blocked.

In FIG. 1*a* a second group of cells denoted "2" having a cell border adjacent the first group identified and blocked in accordance with step 14 and 15.

In steps 16 and 17, the channels are changed in the first group of cells and the cells are subsequently changed.

According to step 14, a "new" second (first) group of cells are identified as those cells which are situated "on the outside" of the present second group of cells. This situation has been depicted by FIG. 1*b,* showing the new first and second group of cells being denoted "1" and "2", respectively.

The above steps 15–17 are repeated for this state.

In this manner, the change of cell plan is being effectuated like rings spreading on the water.

The analogy to water holds true if it is assumed that the cells are of the same size. It should be noted that the change in cell plan ends when the changes are reaching the boundaries of the network, in accordance with step 18.

It should also be noted that the step 16—perform channel changes in the first group of cells can be undertaken at any time between step 13 and 17 with the same effect.

It should be noted that the above routine could be applied for many cell plan changes.

The above routine may for instance be used for umbrella cell structures, i.e. plans incorporating micro and macro cells, in such a way that respective first routines are applied on the macro cell layer and the micro layer starting from cells covering a given common area. Thereafter, the routines could spread in synchronisation; that is, the channel change proceeds either such that areas are blocked simultaneously or with a certain time lag.

Second Preferred Embodiment

Routine #2

In FIGS. 2*a* and 2*b*, respectively a current and a new cell plan have been indicated for a given cell pattern consisting of a number of equipments. It should be understood that the cell plan and the change thereof are only exemplary. Typically, the cell plan would be much larger. FIG. 2*a* shows the current channels being allocated equipment 1–12, forming cells A–D, respectively and FIG. 2*b* shows the channels changed to for the respective equipments.

FIG. II illustrates the second preferred routine according to the invention.

FIG. 3 indicates how the changes according to routine #2 indicated in FIG. II are, or should be, performed over time. Hence, FIG. 3 represents the channel change sequence produced by routine #2 for the given cellular network and channel change plan.

The notion one "Inc" (increments) could relate to either a first sequence of steps, for instance comprising 23–24–25–26, c.f. FIG. II, or a second sequence of steps, for instance 27–28–29, c.f. FIG. II. Hence, the notion increments relate to the duration of the cell change process.

In FIG. 3, the notion "blc" means that the equipment in question is blocked. The notion "-" means that the equipment in question is continued being blocked. A number, for instance "4" means that the equipment has changed channel to channel no. 4 and that the equipment in question has been enabled, i.e. switched on.

The steps according to the second routine shall now be explained with reference to the above figures and tables.

Inc. 1

In step 21, a consecutive equipment order number including an initial equipment order number is defined. This order number appears under the field "order" in the table FIG. 3. In the present example, the consecutive number order happens to be defined by increasing numbers, but an arbitrary order could be chosen.

In increment 1, the situation is as depicted in FIG. 2*a;* i.e. the current cell plan is in existence.

Inc. 2

In increment 2, step 22 the equipment order is set to 1 and in step 23 equipment number 1 is "selected".

In step 24, selected equipment 1 is blocked. In step 25, the channel is changed from 11 to 4 (this effect not being visible in FIG. 3) on the selected equipment 1 and the equipment using the channels changed to under the current cell plan is marked, i.e. equipment 4 using channel 4.

According to step 26, equipment 4 presently using marked channel 4 is also blocked.

Inc. 3

Provided that the new cell plan is not affected with disturbances per se, equipment 1 can now change channel from 11 to 4, since channel 4 is blocked on other equipments.

This change is put into effect by the enablement of the selected equipment 1 according to step 27.

According to steps 28–29, the routine is continued with a new selected order number 2.

Inc. 4

Subsequently, in increment 4, steps 23 and 24, equipment 2 is selected and blocked. In step 25 the channel is changed on equipment 2 and channel 21, presently being used on equipment 2 is marked.

In step 26 equipment 9 is also blocked, because equipment 9 currently uses the marked channel 21, which equipment 2 should change to according to the new plan.

Inc. 5

In step 27, equipment 2 is enabled using channel 21, while equipments 4 and 9 continue being blocked.

Inc. 6

The routine subsequently carries on with order number 3, relating to equipment number 3. This equipment should remain using channel 8 and the channel is therefore not blocked and changed in accordance with steps 24 and 25. However, according to step 25, channel 8 is marked.

Equipments 7 and 12, which presently use marked channel 8 are blocked according to steps 25 and 26.

Inc. 7–25

The routine is repeated with equipments 4 to 12 and then the routine is stopped in steps 28 and 30.

In the rightmost column of FIG. 3 the number of blocked equipments using routine #2 on the cell plan change specified in FIGS. 2*a* and 2*b* has been indicated. The sum corresponds to the accumulated blocking time. It is seen that the sum is 55 for the shown example.

It should be noted that the performance of channel changes in step 25 could be carried out in or after step 26 with the same effect.

It should also be noted that the above routine could be directly applied for cell structures involving umbrella cells.

Moreover, it should be understood that the channel change sequence, which is produced by the above routine, would serve as input data to the network management system, which would carry out the changes in the specified way.

Third Preferred Embodiment

Routine #3*a*

A third routine has been shown in FIG. IIIa and a table relating to the same cell plan change as set out in FIGS. 2*a* and 2*b* showing the incremental changes over time has been shown in FIG. 4.

The table in FIG. 4 uses a corresponding terminology with the table in FIG. 3 and it need therefore no further explanation.

As can be seen from comparing FIG. IIIa with FIG. II, the channel number used under the current cell plan is applied for determining the channel plan changing sequence instead of applying the equipment number as in routine #2. Please confer step 31 in FIG. IIIa with step 21 in FIG. II.

Inc. 1

Accordingly, the routine #3*a* starts at increment 1, step 31 defining a consecutive order number, which could be arbitrarily selected. In step 32 the initial channel number in the consecutive order is set to 4.

Inc. 2

In increment 2, step 33, equipment number 4, which happens to use channel number 4 under the current cell plan, is selected. In step step 34 selected equipment 4 is blocked.

In step 35, equipment 4 is changed to channel 12. No other equipments are presently using channel number 12—no channels are marked.

Inc. 3

In step 37, equipment 4 is enabled using channel 12.

Inc. 4–5

The routine continues with new order number 5 according to steps 38–39 such that equipment 5 using channel 5 is changed to channel 9.

Inc. 6

The next order number is 6 corresponding to channel number 6.

Equipment 8 and 11 are presently using channel 6 and they are selected in step 33. According to step 34, these equipments are blocked. Equipment 8 and 11 are to be changed to 7 and 21, respectively, which are marked according to step 35.

Marked channels 7 and 21 are presently being used on equipments 2, 6 and 9, which are blocked according to step 36.

Therefore, equipments, 2, 6, 8, 9 and 11 are blocked in step 36.

Inc. 7

In increment 7, step 37, selected equipments 8 and 11 are enabled.

Inc. 8–15

Subsequently, the routine carries on in a similar fashion on order numbers 7, 8, 11 and 21.

It is seen that the above routine could be applied to any cellular network, such as networks comprising umbrella cells.

Alternative to the Third Preferred Embodiment

In FIG. IIIb an alternative to the third routine has been disclosed. Alternative routine #IIIb differs from routine IIIa only in that step 31 and 33 are replaced by step 31*b* and 33*b*, respectively.

Instead of using the channel number order according to the current cell plan, the channel order number order according to the new cell plan is used for determining the channel change sequence.

In table 5, the sequence for the channel change implementation over time has been shown for the given example indicated on FIGS. 2*a* and 2*b*.

The functioning of this routine will appear clearly from a comparison of FIG. 4 versus FIG. 5 and FIG. IIIa versus FIG. IIIb, and the alternative routine shall therefore not be described further here.

Fourth Embodiment

In FIG. IV, a fourth routine according to the embodiment has been shown. In FIG. 6, the individual steps according to the fourth routine shall be explained having regard to the example cell plan change shown in FIGS. 2*a* and 2*b*.

Inc. 1

According to step 41, a random start equipment—number 8—is chosen and this equipment is being selected according to step 42.

In step 43, the selected equipment number 8 is blocked. In step 44 equipment 8 is changing channel from 6 to 7 and according to step 44 channel 7 is marked. According to step 45, the equipment presently using the marked channel under the current cell plan, i.e. equipments 2 and 6 are blocked.

Inc. 2

In step 46, equipment 8 is enabled and according to step 48, equipment 2, presently being blocked, is selected randomly.

Optionally, the decision on which particular blocked equipment to select among more simultaneously blocked equipments, could be decided according to a predetermined equipment order or channel order sequence.

However, in the present example equipment 2 is selected.

Inc. 3

According to step 43, equipment 2 is re-blocked, which has no effect since it is already blocked.

According to step 44 channel 21, to be changed to for selected equipment 2, is marked. Accordingly, in step 45, equipment 9, presently using marked channel 21, is blocked.

Then, in step 46, equipment 2 is enabled.

In step 48, equipment 6, presently being blocked is randomly selected and the above steps are repeated.

Inc. 4–16

According to the present example, in increments 4–16 there are only blocked equipments available to select from in step 48 and equipments are chosen randomly in the following order: 9-7-12-1-4.

However, in increment 16, step 48, no equipments are presently blocked and according to step 48 another equipment, here equipment number 5, is selected randomly among the two equipments 5 and 11 which have not been changed yet.

Again, the choice could be made subject to a particular equipment order or channel order sequence.

Inc. 17, 18

Equipment 5 is blocked, changed and enabled.

Inc. 19, 20

Equipment 11, being the last equipment to be changed is blocked, changed and enabled.

Complementing Embodiments

The above routine #2, #3*a*, #3*b* and #4 may be combined with the following routine #0, shown in FIG. V, whereby routine #0 is preferably carried out prior to the above routines.

The initial routine #0 aims at reducing the number of blockings in the channel change sequence.

Initial routine #0 shall now be explained for the given example shown in FIGS. 2*a* and 2*b*, with reference to the tables shown in FIGS. 7 and 8.

In FIG. 7, the initial routine #0 is initially applied.

Inc. 1—FIG. 7

According to step 111 an initial group of equipments comprising equipments that shall not be changed and equipments that shall be changed to a channel, which is not used under the current cell plan is defined.

For the given example, equipments 3 and 10 shall not be changed and equipments 4, 5, 7 and 12 shall change channel to channels not used under the new cell plan. These equipments are defined as belonging to the initial group.

In step 112, those equipments of the initial group that shall be changed are blocked.

Inc. 2—FIG. 7

In step 113, the equipments in the initial group are enabled. According to step 115 the initial group of equipment are excluded from further change and any of the routines 2#, #3*a*, #3*b* and #4 are carried on with on this basis.

In the present example, routine #2 is carried out next and the initial group of equipments is therefore excluded from the consecutive sequence order.

Inc. 1—FIG. 8

According to step 21 of FIG. II, a consecutive sequence order is defined by the following equipment number order: 1, 2, 6, 8, 9 and 11.

The routine is performed as explained under FIG. 3.

Further Embodiments

It should be understood that it would be possible to combine routine #0 with the above routines #1, #3*a,* #3*b* and #4 in the same manner as with routine #2.

It should also be understood that the above routines might be combined in other ways of what has been explicitly described above. It would for instance be possible to incorporate steps of the initial routine #0 into the routines #1, #2, #3*a,* #3*b* and #4. It would also be possible to combine for instance elements of routines #3*a* and #4, with one another.

An advantageous embodiment, consists of a combination of routines #0, #1 and #4, according to which larger geografical areas or rings are selected subsequently in analogy with routine #1 and whereby, within these larger areas, the change plan is effectuated by first performing routine #0 and then performing routine #4. Other combinations can also be envisaged.

According to a further embodiment of the invention, the above channel changes following from some or all of the above routines could be tested—i.e. simulated before being chosen to be carried out—for a given network and a given channel plan change.

The blocking time for the various options could be calculated and the option, which yields the lowest result, could be chosen.

This examination of an appropriate routine for the given circumstances could moreover extend to testing various arbitrary consecutive order number lists as defined in step 21 of routine #2, step 31 in routine #3*a,* step 31*b* in routine #3*b* for example.

Moreover, tests could be accomplished for combinations of the routines #0, #1 #2, #3*a,* #3*b* and #4.

The particular routine, or combination of routines, accomplishing the channel change sequence with the lowest number of blockings or the most appropriate changing time is advantageously chosen.

What is claimed is:

1. Method for implementing channel changes from a current plan to a new predetermined plan in a cellular network comprising a plurality of cells, each cell corresponding to at least one equipment, to which a channel may be allocated for communicating signals to and from mobile end stations in the cell;

each equipment in the network being adapted for receiving channel change information; blocking operation; performing a channel change according to the predetermined new channel plan and enabling operation; the method comprising the steps of initially selecting at least one start cell in the cellular network;

defining a first group of cells (1) comprising only the start cell(s) (12), blocking equipment that shall be changed in the first group of cells (13), performing a sub-routine carrying out the following steps:

identifying a second group of cells (2) not identified previously and having a cell border being adjacent the first group of cells (1, 14), blocking equipment that shall be changed in the second group of cells (2, 15) while performing changes from the current cell plan to the new cell plan on equipment in the first group of cells (1, 16), enabling the first group of cells (1, 17), repeating this procedure with a new first group of cells being equal to the second group of cells (1:=2) until all cells have been changed (18, 19).

2. Method for implementing channel changes from a current to a new cell plan and being adapted to carried out prior to or in combination with the methods according to claim 1, wherein the following steps are carried out:

defining any initial group of equipments comprising equipments that shall not be changed and equipments that shall be changed to a channel which is not used under the current cell plan;

blocking equipments that shall be changed in initial group;

performing channel changes on equipment in initial group;

enabling equipments in initial group of equipments; and excluding equipments from initial group from being processed further.

3. Method for implementing channel changes from a current to a new cell plan according to claim 2, involving that at least two of the methods according to claim 2 are carried out for testing purposes, whereby the results appearing from the comparative tests are used to determine which channel plan change according to the respective methods should be used to implement the given channel plan change.

4. Method for implementing channel changes from a current to a new cell plan according to claim 1, involving that at least two of the methods according to claim 1 are carried out for testing purposes, whereby the results appearing from the comparative tests are used to determine which channel plan change according to the respective methods should be used to implement the given channel plan change.

5. Method for implementing channel changes from a current plan to a new predetermined plan in a cellular network comprising a plurality of cells, each cell corresponding to at least one equipment, in which a channel may be allocated for communicating signals to and from mobile end stations in the cell;

each equipment in the network being adapted for receiving channel change information; blocking operation; performing a channel change according to the predetermined new channel plan and enabling operation, the method comprising the steps of defining a consecutive equipment number order and selecting an initial order number (21);

setting a selected equipment number equal to the initial order number (22);

performing a sub-routine wherein the following steps are carried out selecting equipment with selected order number;

blocking the equipment or equipments with the selected order number that shall be changed (24);

changing channel in selected equipments according to the new cell plan while marking the channel or channels to be used under the new cell plan (25) while blocking the equipments presently using the marked channels under the current cell plan (26);

enabling selected equipment or equipments (27);

repeating the routine setting the selected order number equal with the subsequent order number (29) until no order numbers are left (28).

6. Method for implementing channel changes from a current to a new cell plan and being adapted to carried out prior to or in combination with the methods according to claim 5, wherein the following steps are carried out:

defining an initial group of equipments comprising equipments that shall not be changed and equipments that shall be changed to a channel which is not used under the current cell plan;

blocking equipments that shall be changed in initial group;

performing channel changes on equipment in initial group;

enabling equipments in initial group of equipments; and excluding equipments from initial group from being processed further.

7. Method for implementing channel changes from a current plan to a new cell plan according to claim 2, involving that at least two of the methods according to claim 5 are carried out for testing purposes, whereby the results appearing from the comparative tests are used to determine which channel plan change according to the respective methods should be used to implement the given channel plan change.

8. Method for implementing channel changes from a current plan to a new predetermined plan in a cellular network comprising a plurality of cells, each cell corresponding to at least one equipment, in which a channel may be allocated for communicating signals to and from mobile end stations in the cell;

each equipment in the network being adapted for receiving channel change information; blocking operation; performing a channel change according to the predetermined new channel plan and enabling operation, the method comprising the steps of defining a consecutive channel number order for the current cell plan and selecting an initial order number (31);

setting a selected channel number equal to the initial order number (32);

performing a sub-routine wherein the following steps are carried out selecting the equipment or equipments having a channel with the selected order number under the current cell plan (33);

blocking selected equipment that shall be changed (34);

changing channel according to the new cell plan in selected equipments (35) while marking the channel or channels changed to and blocking the equipments presently using the marked channels under the current cell plan (36);

enabling selected equipments (37);

repeating the routine setting the selected order number equal with the subsequent order number (39) until no order numbers are left (38).

9. Method for implementing channel changes from a current to a new cell plan and being adapted to carried out prior to or in combination with the methods according to claim 8, wherein the following steps are carried out:

defining an initial group of equipments comprising equipments that shall not be changed and equipments that shall be changed to a channel which is not used under the current cell plan;

blocking equipments that shall be changed in initial group;

performing channel changes on equipment in initial group;

enabling equipments in initial group of equipments; and excluding equipments from initial group from being processed further.

10. Method for implementing channel changes from a current to a new cell plan according to claim 8, involving that at least two of the methods according to claim 8 are carried out for testing purposes, whereby the results appearing from the comparative tests are used to determine which channel plan change according to the respective methods should be used to implement the given channel plan change.

11. Method for implementing channel changes from a current plan to a new predetermined plan in a cellular network comprising a plurality of cells, each cell corresponding to at least one equipment, in which a channel may be allocated for communicating signals to and from mobile end stations in the cell;

each equipment in the network being adapted for receiving channel change information; blocking operation; performing a channel change according to the predetermined new channel plan and enabling operation, the method comprising the steps of defining a consecutive channel number order for the new cell plan and defining an initial order number (**31*b***);

setting a selected channel number equal to the initial order number (32);

performing a sub-routine wherein the following steps are carried out selecting the equipment or equipments getting a channel with the selected order number under the new cell plan (**33*b***);

blocking selected equipment that shall be changed (34);

changing channel according to the new plan in selected equipments (35) while marking the channel or channels changed to and blocking the equipments presently using the marked channels under the current cell plan (36);

enabling selected equipments (37);

repeating the routine setting the selected order number equal with the subsequent order number (39) until no order numbers are left (38).

12. Method for implementing channel changes from a current to a new cell plan and being adapted to carried out prior to or in combination with the methods according to claim 11, wherein the following steps are carried out:

defining an initial group of equipments comprising equipments that shall not be changed and equipments that shall be changed to a channel which is not used under the current cell plan;

blocking equipments that shall be changed in initial group;

performing channel changes on equipment in initial group;

enabling equipments in initial group of equipments; and excluding equipments from initial group from being processed further.

13. Method for implementing channel changes from a current to a new cell plan according to claim 11, involving that at least two of the methods according to claim 11 are carried out for testing purposes, whereby the results appearing from the comparative tests are used to determine which channel plan change according to the respective methods should be used to implement the given channel plan change.

14. Method for implementing channel changes from a current plan to a new predetermined plan in a cellular network comprising a plurality of cells, each cell corresponding to at least one equipment, in which a channel may be allocated for communicating signals to and from mobile end stations in the cell;

each equipment in the network being adapted for receiving channel change information; blocking operation; performing a channel change according to the predetermined new channel plan and enabling operation, the method comprising the steps of selecting a start equipment or channel (41, 42), performing a sub-routine wherein the following steps are carried out blocking selected equipment that shall be changed (43), changing channel in selected equipments according to new cell plan, while marking the channel or channels changed to and blocking the equipments presently using the marked channels under the current cell plan (44, 45), enabling selected equipments (46), repeating, until all channels have been changed, the above subroutine on an equipment that is presently blocked; and if no equipments are blocked then selecting another equipment that shall be changed (47, 48).

15. Method for implementing channel changes from a current to a new cell plan and being adapted to carried out prior to or in combination with the methods according to claim 14, wherein the following steps are carried out:

defining an initial group of equipments comprising equipments that shall not be changed and equipments that shall be changed to a channel which is not used under the current cell plan;

blocking equipments that shall be changed in initial group;

performing channel changes on equipment in initial group;

enabling equipments in initial group of equipments; and excluding equipments from initial group from being processed further.

16. Method for implementing channel changes from a current to a new cell plan according to claim 14, involving that at least two of the methods according to claim 14 are carried out for testing purposes, whereby the results appearing from the comparative tests are used to determine which channel plan change according to the respective methods should be used to implement the given channel plan change.

* * * * *